United States Patent
Darling et al.

(10) Patent No.: US 10,044,058 B2
(45) Date of Patent: Aug. 7, 2018

(54) REACTIVATION OF FLOW BATTERY ELECTRODE BY EXPOSURE TO OXIDIZING SOLUTION

(71) Applicant: United Technologies Corporation, Hartford, CT (US)

(72) Inventors: Robert Mason Darling, South Windsor, CT (US); Rachid Zaffou, West Hartford, CT (US); Michael L. Perry, Glastonbury, CT (US); Craig R. Walker, South Glastonbury, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 306 days.

(21) Appl. No.: 14/770,969

(22) PCT Filed: Mar. 15, 2013

(86) PCT No.: PCT/US2013/032091
§ 371 (c)(1),
(2) Date: Aug. 27, 2015

(87) PCT Pub. No.: WO2014/142968
PCT Pub. Date: Sep. 18, 2014

(65) Prior Publication Data
US 2016/0013505 A1    Jan. 14, 2016

(51) Int. Cl.
*H01M 8/18* (2006.01)
*H01M 8/20* (2006.01)

(52) U.S. Cl.
CPC ............. *H01M 8/188* (2013.01); *H01M 8/20* (2013.01); *Y02E 60/528* (2013.01)

(58) Field of Classification Search
None
See application file for complete search history.

(56) References Cited

U.S. PATENT DOCUMENTS

| 5,318,865 A | 6/1994 | Kaneko et al. |
| 5,648,184 A | 7/1997 | Inoue et al. |
| (Continued) | | |

FOREIGN PATENT DOCUMENTS

| JP | S54-19228 | 7/1979 |
| JP | 61173468 | 8/1986 |
| (Continued) | | |

OTHER PUBLICATIONS

International Search Report for PCT Application No. PCT/US2013/032091 completed May 7, 2013.

(Continued)

*Primary Examiner* — Rena Dye Cronin
(74) *Attorney, Agent, or Firm* — Carlson, Gaskey & Olds, P.C.

(57) ABSTRACT

A flow battery includes at least a cell that has a first electrode, a second electrode and an electrolyte separator layer arranged between the electrodes. A supply/storage system is external of the cell and includes a first vessel fluidly connected in a first loop with the first electrode and a second vessel fluidly connected in a second loop with the second electrode. The first loop and the second loop are isolated from each other. The supply/storage system is configured to fluidly connect the first loop and the second loop to move a second liquid electrolyte from the second vessel into a first liquid electrolyte in the first vessel responsive to a half-cell potential at the first electrode being less than a defined threshold half-cell potential.

15 Claims, 3 Drawing Sheets

(56) References Cited

U.S. PATENT DOCUMENTS

| | | | |
|---|---|---|---|
| 7,199,550 B2* | 4/2007 | Tsutsui | H01M 2/40 307/66 |
| 8,587,255 B2* | 11/2013 | Parakulam | H01M 8/0432 320/128 |
| 9,166,243 B2 | 10/2015 | Perry | |
| 2004/0070370 A1* | 4/2004 | Emura | H02J 3/32 320/128 |
| 2005/0136301 A1 | 6/2005 | Knaggs et al. | |
| 2008/0274393 A1 | 11/2008 | Markoski et al. | |
| 2008/0292938 A1 | 11/2008 | Perry et al. | |
| 2009/0136789 A1 | 5/2009 | Pien et al. | |
| 2010/0003586 A1 | 1/2010 | Sahu | |
| 2010/0047671 A1 | 2/2010 | Chiang et al. | |
| 2011/0086247 A1 | 4/2011 | Keshavarz et al. | |
| 2012/0045680 A1 | 2/2012 | Dong et al. | |
| 2013/0011704 A1 | 1/2013 | Horne et al. | |

FOREIGN PATENT DOCUMENTS

| | | |
|---|---|---|
| JP | 01146267 | 6/1989 |
| JP | H02-148659 | 6/1990 |
| JP | 09101286 | 4/1997 |
| JP | 2003303611 | 10/2003 |
| JP | 2006-156029 | 6/2006 |
| JP | 200 | 7/2007 |
| WO | 20080148148 | 12/2008 |
| WO | 20120135473 | 10/2012 |
| WO | 2012160406 | 11/2012 |

OTHER PUBLICATIONS

European Search Report for European Patent Application No. 13878324 completed Sep. 30, 2016.
International Preliminary Report on Patentability for PCT Application No. PCT/US2013/032091 dated Sep. 24, 2015.
File History for U.S. Appl. No. 13/513,651 now U.S. Pat. No. 9,166,243 dated Oct. 20, 2015.
Certified Translation. Japanese Publication of Examined Patent Application No. S52-102887 published Jul. 13, 1979.
Certified Translation. Japanese Unexamined Patent Application No. H2-148659 published Jun. 7, 1990.
Certified Translation. Japanese Unexamined Patent Application No. 2006-156029 published Jun. 15, 1990.
Linden, D. and Reddy, T.B. Eds. (2002). Handbook of batteries. New York, NY: McGraw-Hill. pp. 37.12, 18-23, 42.3-13, 43.11-3, Appendix A.
Laramini, J. and Dicks, A. (2003). Fuel cell systems explained. Chichester, England: John Wiley & Sons Inc. pp. xv, xvi, 18-9, 88-9, 94-6.
Haar, D. (2016). Dan Haar: United Technologies battery could upend the power business. Hartford Courant. Retrieved Feb. 22, 2017 from: http://www.courant.com/business/dan-haar/hc-haar-united-technologies-battery-for-electric-grid-20160523-column.html.

Aricò, A.S., Cretì, P., Baglio, V., Modica, E., and Antonucci, V. (2000). Influence of flow field design on the performance of a direct methanol fuel cell. Journal of Power Sources vol. 91. 2000. pp. 202-209.
Li, X. and Sabir, I. (2004). Review of bipolar plates in PEM fuel cells: Flow-field designs. International Journal of Hydrogen Energy vol. 30. 2005. pp. 359-371.
Negishi, A. (2003). Redox flow battery. (Certified Translation). Fuel Cells vol. 2(4). 2003. pp. 69-74.
Yi, J.S., and Nguyen T.V. (1996). Abstract: Hydrodynamics of reactant gas in the electrode of PEM fuel cells with inter-digitated flow fields. The Electrochemical Society, Inc. Meeting Abstracts. Fall Meeting, San Antonio, TX. Oct. 6-11, 1996. p. 974-6.
Kazim, A., Liu, H.T., and Forges, P. (1999). Modelling of performance of PEM fuel cells with conventional and interdigitated flow fields. Journal of Applied Electrochemistry vol. 29(12). 1999. pp. 1409-1416.
Wang, L. and Liu, H. (2004). Performance studies of PEM fuel cells with interdigitated flow fields. Journal of Power Sources vol. 13(2). 2004. pp. 185-196.
Guo, S.M. (2005). The simulation of a PEMFC with an interdigitated flow field design. Computational Science 5th International Conference. May 2005. pp. 104-111.
He, W., Yi, J.S., Nguyen, T.V. (2000). Two-phase flow model of the cathode of PEM fuel ceels using interdigitated flow fields. AIChE Journal vol. 46(10). Oct. 2000. pp. 2053-2064.
Nozaki, K., Hamamoto, O., Kaneko, H., and Ozawa, T. (1975). (Certified Translation). Prospect of power storage using redox flow type secondary battery. Electrochemical/Electro-thermal Study Group Material. The Institute of Electrical Engineers of Japan. Nov. 28, 1975. pp. 1-16.
Declaration of Dr. Toru Kato, Ph.D. In re U.S. Pat. No. 9,166,243. Executed Feb. 23, 2017. pp. 1-89.
Prior Art Claim Chart for U.S. Pat. No. 9,166,243.
Ponce de León, C., Frías-Ferrer, A., González-García, Szánto, D.A., and Walsh, F.C. (2006). Redox flow cells for energy conversion. Journal of Power Sources vol. 160. 2006. pp. 716-732.
Negishi, A. (2003). Redox flow battery. Fuel Cells vol. 2(4). 2003. pp. 69-74.
Nozaki, K., Hamamoto, O., Kaneko, H., and Ozawa, T. (1975). Prospect of power storage using redox flow type secondary battery. Electrochemical/Electro-thermal Study Group Material. The Institute of Electrical Engineers of Japan. Nov. 28, 1975. pp. 1-16.
Shigematsu, T. (2011). Redox flow battery for energy storage. SEI Technical Review No. 73. Oct. 2011. pp. 4-13.
Tokuda, N., Kanno, T., Hara, T., Shigematsu, T., Tsutsui, Y., Ikeuchi, A., Itou, T., et al. (2000). Development of a redox flow battery system. SEI Technical Review No. 73. Jun. 2000. pp. 88-94.
Hagedorn, N.H. (1984). NASA redox storage system development project. Final Report. DOE/NASA/12726-24. Oct. 1984. pp. 1-43.
Sumitomo Electric. Redox Flow Battery. Technical Document. Retrieved May 8, 2017 from: http://global-sei.com/products/redox/pdf/redox-flow-battery.pdf.
Petition for Inter Partes Review of U.S. Pat. No. 9,166,243. *Sumitomo Electric Industries, Ltd.,* Petitioner, v. *United Technologies Corporation,* Patent Owner. Filed Feb. 23, 2017.

* cited by examiner

REACTIVATION OF FLOW BATTERY ELECTRODE BY EXPOSURE TO OXIDIZING SOLUTION

STATEMENT REGARDING FEDERALLY SPONSORED RESEARCH OR DEVELOPMENT

This invention was made with government support under contract DE-AR0000149 awarded by the United States Department of Energy. The government has certain rights in the invention.

BACKGROUND

Flow batteries, also known as redox flow batteries or redox flow cells, are designed to convert electrical energy into chemical energy that can be stored and later released when there is demand. As an example, a flow battery may be used with a renewable energy system, such as a wind-powered system, to store energy that exceeds consumer demand and later release that energy when there is greater demand.

A typical flow battery includes a redox flow cell that has a negative electrode and a positive electrode separated by an electrolyte layer, which may include a separator, such as an ion-exchange membrane. A negative fluid electrolyte (sometimes referred to as the anolyte) is delivered to the negative electrode and a positive fluid electrolyte (sometimes referred to as the catholyte) is delivered to the positive electrode to drive electrochemically reversible redox reactions. Upon charging, the electrical energy supplied causes a chemical reduction reaction in one electrolyte and an oxidation reaction in the other electrolyte. The separator prevents the electrolytes from freely and rapidly mixing but permits selected ions to pass through to complete the redox reactions. Upon discharge, the chemical energy contained in the liquid electrolytes is released in the reverse reactions and electrical energy can be drawn from the electrodes. Flow batteries are distinguished from other electrochemical devices by, inter alia, the use of externally-supplied, fluid electrolyte solutions that include reactants that participate in reversible electrochemical reactions.

SUMMARY

Disclosed is a flow battery that includes at least one cell that has a first electrode, a second electrode spaced apart from the first electrode, and an electrolyte separator layer arranged between the electrodes. A supply/storage system is external of the cell and includes a first vessel that is fluidly connected in a first loop with the first electrode and a second vessel that is fluidly connected in a second loop with the second electrode. The first loop and the second loop are fluidly isolated from each other with respect to open fluid flow there between. The supply/storage system is configured to fluidly connect the first loop and the second loop to move a second liquid electrolyte from the second vessel into a first liquid electrolyte in the first vessel responsive to a half-cell potential at the first electrode being less than a defined threshold half-cell potential. The first and second electrolyte contain active species that can chemically derived from the same starting chemical, for example the active species could be a vanadium salt in both the first and second electrolyte.

A method of operating a flow battery includes rebalancing amounts of a first fluid electrolyte and a second fluid electrolyte in a flow battery in response to the half-cell potential being less than a defined threshold half-cell potential.

Also disclosed is a flow battery with a first vessel that is fluidly connectable in a first loop with each of the first electrodes and the second electrodes, and a second vessel that is fluidly connectable in a second loop with each of the first electrodes and the second electrodes. The supply/storage system includes a first configuration in which the first vessel is fluidly connected in the first loop with the first electrode and the second vessel is fluidly connected in the second loop with the second electrode, and a second configuration in which the first vessel is fluidly connected in the first loop with the second electrode and the second vessel is fluidly connected in the second loop with the first electrode

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
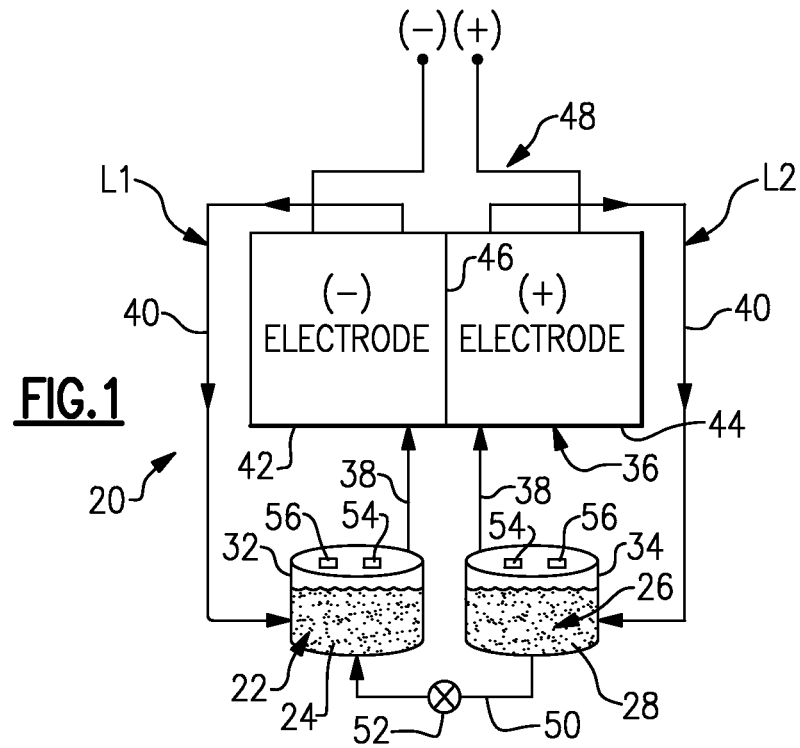
FIG. 1 illustrates an example flow battery that is configured to fluidly connect a first loop and a second loop responsive to a half-cell potential at a first electrode being less than a defined threshold half-cell potential.

FIG. 1 schematically shows portions of an example flow battery 20 for selectively storing and discharging electrical energy. As an example, the flow battery 20 can be used to convert electrical energy generated in a renewable energy system to chemical energy that is stored until a later time when there is greater demand, at which time the flow battery 20 then converts the chemical energy back into electrical energy. The flow battery 20 can supply the electric energy to an electric grid, for example. As will be described, the disclosed flow battery 20 includes features for enhanced durability with respect to maintaining high cell performance for as long as possible by mitigating decay mechanisms or implementing recovery procedures.

The flow battery 20 includes a fluid electrolyte 22 that has at least one electrochemically active species 24 that functions in a redox pair with regard to an additional fluid electrolyte 26 that has at least one electrochemically active species 28. For example, the electrochemically active species 24/28 are based on vanadium or iron. In embodiments, the fluid electrolytes 22 and 26 are solutions that include one or more of the electrochemically active species 24/28. The first fluid electrolyte 22 (e.g., the negative electrolyte) and the second fluid electrolyte 26 (e.g., the positive electrolyte) are contained in a supply/storage system 30 that includes first and second vessels 32/34.

The fluid electrolytes 22/26 are delivered (e.g., pumped) to at least one cell 36 of the flow battery 20 through respective feed lines 38 and are returned from the cell 36 to the vessels 32/34 via return lines 40. The feed lines 38 and the return lines 40 connect the vessels 32/34 in respective loops L1/L2 with first and second electrodes 42/44. Multiple cells 36 can be provided as a stack in communication with each of the loops L1/L2.

The cell or cells 36 each include the first electrode 42, the second electrode 44 spaced apart from the first electrode 42, and an electrolyte separator layer 46 arranged between the first electrode 42 and the second electrode 44. For example, the electrodes 42/44 are porous carbon structures, such as carbon paper or felt. In general, the cell or cells 36 can include bipolar plates, manifolds and the like for delivering the fluid electrolytes 22/26 through flow field channels to the electrodes 42/44. It is to be understood however, that other configurations can be used. For example, the cell or cells 36 can alternatively be configured for flow-through operation where the fluid electrolytes 22/26 are pumped directly into the electrodes 42/44 without the use of flow field channels.

The electrolyte separator layer 46 can be an ionic-exchange membrane, a micro-porous polymer membrane or an electrically insulating microporous matrix of a material, such as silicon carbide (SiC), that prevents the fluid electrolytes 22/26 from freely and rapidly mixing but permits selected ions to pass through to complete the redox reactions while electrically isolating the electrodes 42/44. In this regard, the loops L1/L2 are isolated from each other during normal operation, such as charge, discharge and shutdown states.

The fluid electrolytes 22/26 are delivered to the cell 36 to either convert electrical energy into chemical energy or, in the reverse reaction, convert chemical energy into electrical energy that can be discharged. The electrical energy is transmitted to and from the cell 36 through an electric circuit 48 that is electrically coupled with the electrodes 42/44.

The negative, first electrode 42 can decay and thus debit the performance and/or reduce the life of the flow battery 20. For example, oxygen-containing groups on the surfaces of the first electrode 42 that normally catalyze the electrochemical reaction with the first electrochemically active species 24 can decay through chemical reduction reactions. There are several factors which, especially in combination, can influence decay. Half-cell potentials at each of the electrodes 42/44 can differ during operation of the flow battery 20. The half-cell potentials can change due to changes in the concentrations of the active species, which will influence the half-cell potential measured at open circuit (i.e., with no current on the cell), and the half-cell potentials will vary during operation due to a variety of factors including the operating current. The difference between the half cell potential measured during operation and the half-cell potential measured at open-circuit is herein defined as the electrode overpotential. In particular, if the half-cell potential or the overpotential at the first electrode 42 is less than a threshold potential for decay then the first electrode 42 can decay. These threshold potentials will depend on the active species and the electrode material, but a threshold half-cell potential is on the order of $-400$ mV$_{SHE}$ and a threshold overpotential would typically be less than $-200$ mV. While not limited to specific reactions, these electrode decay mechanisms could include such reactions as the electrochemical reduction of oxide species on the carbon electrodes that may enhance the redox reaction kinetics, which may be prone to occur at low local potentials.

Additionally, in comparison to the second fluid electrolyte 26, the active species in the negative first fluid electrolyte 22 have a higher tendency to pass through (e.g., by diffusion) the electrolyte separator layer 46 and mix into the second fluid electrolyte 26. Over time, the amount of the first fluid electrolyte 22 decreases and the amount of the second fluid electrolyte 26 increases. The decreased amount of the active species in the first fluid electrolyte 22 available locally at the first electrode 42 thus becomes a limiting factor in the electrochemical reaction, where the amount of the second fluid electrolyte 26 was previously the limiting factor. This promotes a less negative overpotential at the first electrode. When the half-cell potential at the first electrode 42 or the overpotential is less than the threshold overpotential, the decay reactions can occur. As will be described in more detail below, the flow battery 20 includes features for balancing the fluid electrolytes 22/26 when the half-cell potential at the first electrode is less than a threshold, in order to reduce or eliminate decay.

In the illustrated example, the flow battery 20 includes an additional feed line 50 directly connecting the vessels 32/34. As an example, a valve 52 can be provided in the feed line 50 to control flow there through. Additionally, although not shown, the valve 52 and other components of the flow battery 20 can be operably connected to a suitable controller, such as a controller including computer hardware, software or both, for controlling the operation either automatically, semi-automatically or manually according to the present disclosure.

The loops L1/L2 are normally isolated from each other. However, the supply/storage system 30 is configured to fluidly connect the loops L1/L2 to move the second liquid electrolyte 26 from the second vessel 34 into the first liquid electrolyte 22 in the first vessel 32 responsive to the half-cell potential at the first electrode 42 being less than a defined threshold half-cell potential. When mixed, the second liquid electrolyte 26 converts into an additional amount of the first liquid electrolyte 22. Thus, as the amount of first fluid electrolyte 22 decreases due to loss from passing through the electrolyte separator layer 46, the amounts of the fluid electrolytes 22/26 are balanced by moving some of the second fluid electrolyte 26 into the first fluid electrolyte 22 responsive to the half-cell potential at the first electrode 42 being less than a defined threshold half-cell potential.

In a further example, the balancing, or rebalancing, is selectively conducted in response to the flow battery being in a fully or near-fully (90%) discharged state, to reduce energy loss. When mixed with the first fluid electrolyte 22, the second fluid electrolyte 26 reacts and reduces to a lower oxidation state. In the discharged state, the second fluid electrolyte 26 is at its lower oxidation state potential and thus the reduction from mixing is smaller in comparison to a reduction from a higher oxidation state potential in the charged condition.

The rebalancing restores the flow battery 20 to a state where the amount of the first fluid electrolyte 22 is not the limiting factor on the electrochemical reaction. The amount of the first fluid electrolyte 22 can therefore support the full electrochemical reaction, without local starvation, which promotes large magnitude overpotentials and side reactions that can cause decay. The limiting factor on the electrochemical reaction is the amount of the positive second fluid electrolyte 26, which increases the flow battery 20 capacity and enhances voltage stability. The first electrode 42 will therefore cycle over a relatively narrow voltage potential range, while the second electrode 44 will cycle over a wider voltage potential range.

In one example, the defined threshold half-cell potential can be set at or according to a level more positive than which decay of the first electrode 42 can occur. When the half-cell potential at the first electrode is less than the defined threshold half-cell potential, the flow battery can be balanced as described, to reduce the possibility of decay and thus enhance performance stability and life.

A decrease in the concentration of the first fluid active species 24 below a certain level can cause the half-cell potential at the first electrode 42 to be less than the defined threshold half-cell potential. In this regard, the vessels 32/34 include at least one level sensor 54 and at least one concentration sensor 56 for determining the volumetric amounts of the fluid electrolytes 22/26 and the concentrations of the active species 24/28, which can be used to determine the amount of electrolyte that should be transferred during rebalancing. For example, the concentration sensors 54/56 can be optical- or absorption-based detectors.

Each of the vessels 32/34 can include both types of the sensors 54/56. In an alternative, only one of the vessels 32/34 includes the concentration sensor 54/56, and the concentration in the other of the vessels 32/34 is determined based upon a predetermined relationship between the levels and concentrations of fluid electrolytes 22/26.

As can be appreciated, the sensors 54/56 can be connected to a suitable controller for monitoring and controlling the operation of the flow battery 20 as described herein. Molar amounts of the active species 24/28 can be determined using the sensors 54/56. For example, the molar amount (N) is a function of concentration (c) and volume (V) as given in Equation 1 below. The calculation in this example does not take into account the amounts of the fluid electrolytes 22/26 outside of the vessels 32/34 which is typically a small amount relative to the amounts in the tanks.

$$N=(c)(V) \quad \text{EQUATION 1:}$$

Based upon the detected levels and concentrations, the molar amounts of the active species 24/28 can be calculated. The molar amounts can then be compared to each other and, if they differ by more than a defined percentage, a portion of the second fluid electrolyte 26 can be pumped into the first fluid electrolyte 22 as described above. In one example, if the molar amounts differ by more than 10%, the supply/storage system 30 responsively pumps a portion of the second fluid electrolyte 26 into the first fluid electrolyte 22 through the feed line 50 until the difference is below 10%. The amount of the second liquid electrolyte 26 needed can be pre-calculated to achieve a known reduction in the percentage.

Figure 2:
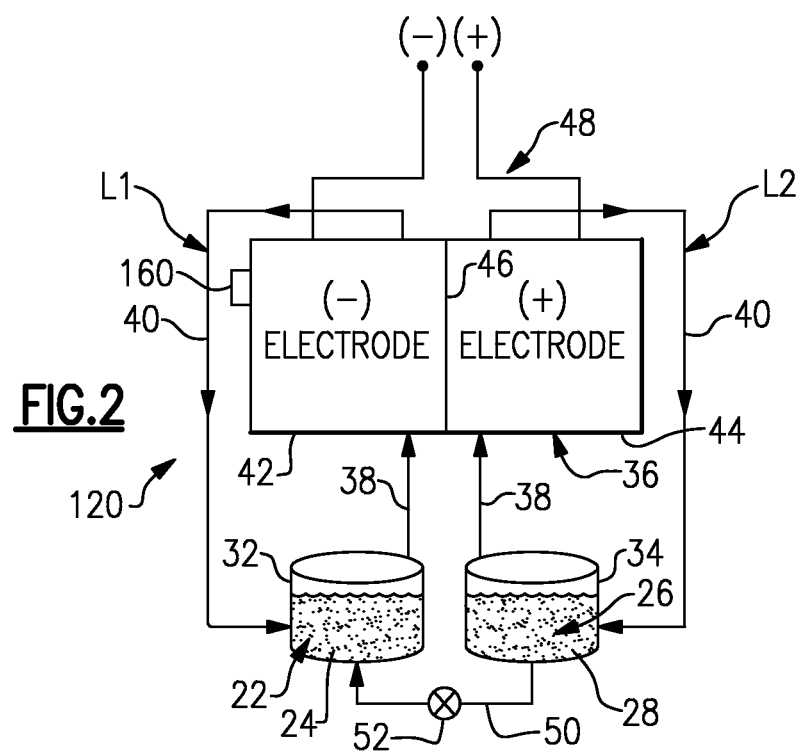
FIG. 2 illustrates another example flow battery that utilizes a reference electrode.

FIG. 2 illustrates another example flow battery 120 that is similar to the flow battery 20 of FIG. 1. In this disclosure, like reference numerals designate like elements where appropriate and reference numerals with the addition of one-hundred or multiples thereof designate modified elements that are understood to incorporate the same features and benefits of the corresponding elements. In this example, the flow battery 120 includes a reference electrode 160 rather than the sensors 54/56, although the sensors 54/56 could be used in combination with the reference electrode 160. The reference electrode 160 is configured to detect the half-cell potential of the first electrode 42. As described above, if the half-cell potential of the first electrode 42 is less than the defined threshold half-cell potential, a portion of the second liquid electrolyte 26 is moved into the first liquid electrolyte 22 to rebalance the liquid electrolytes 22/26 and thus reduce the possibility of decay.

Flow batteries are also susceptible to decay at the positive electrode. For example, the half-cell potential at the positive electrode is typically higher than the thermodynamic potential for carbon oxidation to carbon dioxide, which can be approximately 0.4 $V_{RHE}$ in strong acid. In particular, during charging of the flow battery, the potential at the positive electrode has to be higher than the thermodynamic potential of carbon corrosion in order to charge a flow battery for the most common active species. Therefore, carbon oxidation or corrosion can occur at a slow rate during normal operation of the positive electrode. The decay of the positive electrode can debit performance and life of the flow battery. Moreover, the positive electrode can possibly decay at a more accelerated rate than the negative electrode, albeit by a different mechanism, if the positive half-cell potential is suitably high. Thus, the durability and life of the positive electrode can also be a limiting factor in the durability and life of a flow battery. Fortunately, the carbon oxidation reaction is relatively sluggish and can be effectively mitigated by using methods taught herein.

Referring again to the flow battery 20 of FIG. 1, the flow battery 20 is also configured to address decay at the positive, second electrode 44. As can be appreciated however, the examples herein can also be applied to other flow battery examples. In one example, the flow of the first fluid electrolyte 22 and the second fluid electrolyte 26 through the flow battery 20 is reversed in response to a defined time period of operation of the flow battery 20 in order to mitigate decay at the negative, first electrode 44. That is, the plumbing with regard to the feed lines 38, return lines 40 and vessels 32/34 is switched such that the first electrode 42, which was originally the negative electrode, is now the positive electrode and the second electrode 44, which was originally the positive electrode, is now the negative electrode. The current through the cell 36 is also reversed. This set of actions restores activity to the original negative electrode. It can also prevent further local corrosion on the original positive, second electrode due to low operating potentials For example, the flow battery 20 can be operated in an initial or original configuration for a defined time period. The time period can be one half of the expected useful life of the flow battery 20, for example. After the defined time period, flow battery 20 is reconfigured by changing the plumbing, and current flow is reversed, as described. The flow battery 20 is then operated for its remaining life, or alternatively a predefined time period, in the switched, reconfigured state such that what was previously the initial or original negative electrode is now the positive electrode and vice versa for the initial or original positive electrode. Thus, any decay that accrues to the initial or original negative electrode is mitigated by using the negative electrode as the positive electrode, which is less susceptible to decay. Exposing the negative electrode to the oxidizing environment of the positive electrode creates or recovers active sites that catalyze the negative reaction. This strategy can be especially effective when the degradation on the two different electrodes is different due to the different decay mechanisms. For example, the decay on the positive electrode may be very localized, where the local potential was highest and therefore carbon corrosion was the highest, but most of the electrode could be relatively unaffected. In this case, this electrode will be an effective negative electrode and the local corrosion will be curtailed on this electrode due to low potentials.

Additionally, there are several other features of the flow battery 20 that facilitate the ability to reverse or balance the flow battery 20. For example, the fluid electrolytes 22/26 are essentially the same composition. Using vanadium as an example, the fluid electrolytes 22/26 can be vanadium-sulfate salts dissolved in dilute sulfuric acid. It is the oxidation states of the vanadium species in the fluid electrolytes 22/26 that vary. Thus, there is little or no concern for cross-mixing the fluid electrolytes 22/26.

Figure 3:
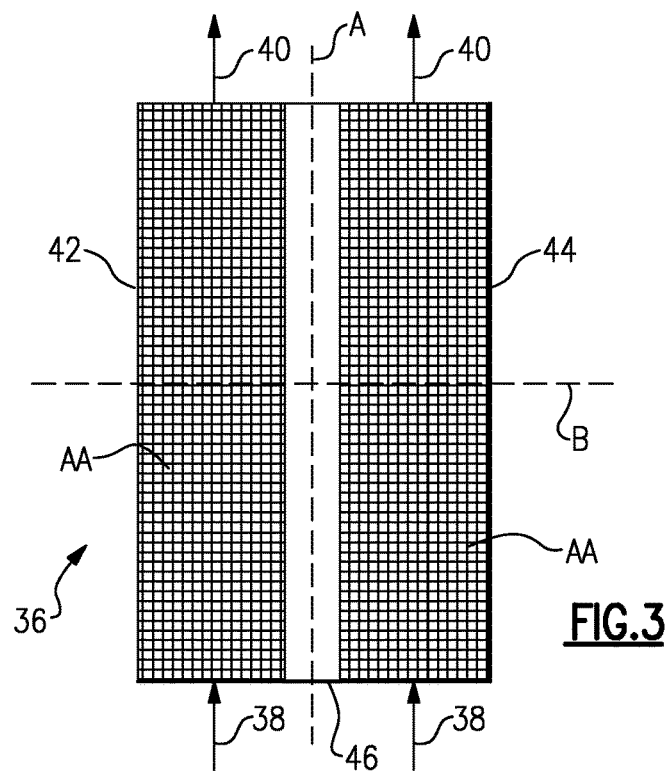
FIG. 3 illustrates an isolated view of a cell having symmetric electrodes.

Additionally, as shown in FIG. 3, the cell 36 can be designed to have symmetry to facilitate reversing the flow battery 20. For example, the first electrode 42 is nominally identical in geometry of active area AA to the second electrode 44 and the electrodes 42/44 are symmetric about the electrolyte separator layer 46, as represented at line A, although the locations of supply and exit manifolds can vary. Each of the electrodes 42/44 can also be symmetric with respect to the active areas AA about their respective vertical mid-lines, as represented at B. Thus, the electrodes 42/44 do not have individualized geometries and each can be readily switched between use as a positive electrode and a negative electrode. The electrodes 42/44 can also be used in either vertical orientation because of the vertical symmetry. Thus, supply/exit manifolds on the top and bottom can serve as exit/supply manifolds in a flipped orientation.

Figure 4:
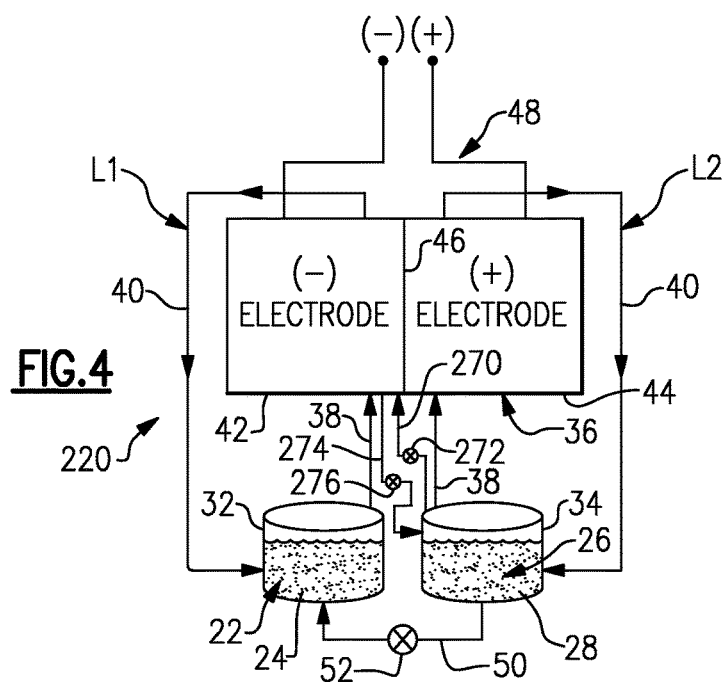
FIG. 4 illustrates another example flow battery configured to re-activate a first electrode.

FIG. 4 illustrates another example flow battery 220 that again is somewhat similar to the flow battery 20 shown in FIG. 1. As discussed above, the first electrode 42 can decay with respect to oxygen containing groups on the carbon surfaces thereof and thus debit the performance of the first electrode 42. Although the decay can be mitigated as discussed herein, should decay occur, the first electrode 42 can be activated, or re-activated, in-situ. For example, the first electrode 42 can be re-activated without removal from the flow battery 220 by exposing it to an oxidizing fluid that oxidizes the surfaces of the carbon to restore the oxygen-containing groups. In one example, the positive second fluid electrolyte 26 serves as the oxidizing fluid. The second liquid electrolyte 26 is convenient to use for the re-activation because it is already present in the flow battery 220. However, alternative oxidizing fluids, such as air, can also be used. The time for the re-activation can vary with the type of oxidizing fluid and can be longer for gaseous oxidizing fluids rather than liquid oxidizing fluids.

To permit re-activation, the flow battery 220 includes an additional feed line 270 connecting the second vessel 34 directly with the first electrode 42. A valve 272 can be provided in the feed line 270 to control flow there through. The second fluid electrolyte 26 can be fed and returned through the feed line 270. Optionally, a separate return line 274 with a valve 276 can be provided for return. Alternatively, the electrodes can be electrically shorted during shutdown periods while ensuring that there is an excess of positive reactant in the stack in order to bring the negative electrode to the relatively high catholyte potential during the shutdown period.

In one example, in response to a period of time of use of the flow battery 220 or in response to a known or calculated amount of decay of the first electrode 42, the first electrode 42 is re-activated. For example, the re-activation includes draining the first fluid electrolyte 22 out of the first electrode 42 and into the first vessel 32. The second fluid electrolyte 26 is then pumped into the first electrode 42 through the feed line 270. The second fluid electrolyte 26 can be held in the first electrode 42 for a predefined amount of time, providing the re-activation reactions to oxidize the carbon surfaces time to proceed. For example, the predefined amount of time can be several hours to a week or more. After re-activation, the second fluid electrolyte 26 is drained from the first electrode back into the second vessel 34. The flow battery 220 can then be operated as normal, with the first electrode 42 being re-activated and replenished with oxide-containing groups.

In one further example, the re-activation is selectively conducted in response to the flow battery being in a fully or near-fully (90%) charged state, to enhance the re-activation. In the charged state, the second fluid electrolyte 26 is at its highest oxidation state and is a stronger oxidizer than its lower oxidation state in the discharge condition. The second fluid electrolyte 26, at its highest oxidation state, can therefore more effectively oxidize the first electrode 42 and reduce the time for re-activation.

The re-activation technique can also be used as a break-in procedure for the flow battery 220 to enhance performance by improving kinetic activity. For example, both electrodes 42/44 can be exposed to the second fluid electrolyte 26 at a relatively high state-of-charge to partially oxidize the electrodes 42/44. That is, both electrodes 42/44 behave as positive electrodes at open-circuit. In one example, the break-in procedure is used as an initial treatment of the flow battery 220 prior to running the flow battery through a cycle of full charge and discharge.

Figure 5:
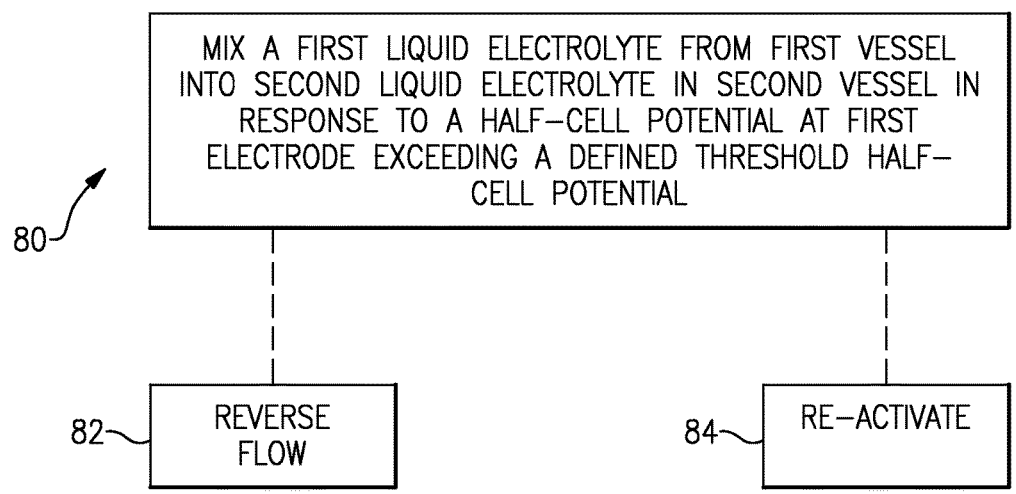
FIG. 5 illustrates an example method of operating a flow battery.

FIG. 5 illustrates an example method 80 of operating a flow battery, such as any of the flow batteries described herein. The method 80 includes rebalancing amounts of the first fluid electrolyte 22 and the second fluid electrolyte 26 in the flow battery 20/120/220 in response to the half-cell potential being less than the defined threshold half-cell potential. For example, the second fluid electrolyte 26 from the second vessel 34 is mixed into the first fluid electrolyte 22 in the first vessel 32 in response to the half-cell potential exceeding the threshold. As also discussed herein with regard to the flow batteries 20/120/220, the method 80 can be further used in combination with swapping the flow of the first liquid electrolyte 22 and the second liquid electrolyte 26 through the cell 36, as represented at 82. Further, the method 80 can also be used in combination with re-activating the first electrode 42, as discussed herein, and as represented at 84. If the base element of the electrochemically active species 24/28 is same on both sides, the polarity of the flow battery 20/120/220 can simply be reversed, followed by an abnormally long charge to convert the positive electrolyte to negative electrolyte and vice versa without changing the plumbing or exchanging the reactants in the two tanks.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A flow battery comprising:
    at least one cell including a first electrode, a second electrode spaced apart from the first electrode, and an electrolyte separator layer arranged between the first electrode and the second electrode; and
    a supply/storage system external of the at least one cell and including:
        a first vessel fluidly connected in a first loop with the first electrode, a second vessel fluidly connected in a second loop with the second electrode, the first loop and the second loop being isolated from each other with respect to open fluid flow there between, and the supply/storage system being configured to fluidly connect the first loop and the second loop to move a second liquid electrolyte from the second vessel into a first liquid electrolyte in the first vessel responsive to a half-cell potential at the first electrode being less than a defined threshold half-cell potential.

2. The flow battery as recited in claim 1, wherein the supply/storage system includes a feed line between the first vessel and the second vessel.

3. The flow battery as recited in claim 1, wherein the first electrode is a negative electrode.

4. The flow battery as recited in claim 1, further comprising a reference electrode configured to determine the half-cell potential of the first electrode.

5. The flow battery as recited in claim 1, wherein the defined threshold half-cell potential is a difference between a half-cell potential taken during operation of the flow battery and a half-cell potential taken at open circuit.

6. The flow battery as recited in claim 1, wherein the supply/storage system includes at least one fluid level sensor and at least one concentration sensor configured to detect, respectively, a level of the first liquid electrolyte in the first vessel and a concentration of the first liquid electrolyte in the first vessel.

7. The flow battery as recited in claim 1, wherein an active area of the at least one cell is symmetrical with respect to the electrolyte separator layer.

8. The flow battery as recited in claim 7, wherein the first electrode and the second electrode include respective vertical mid-lines about which the first electrode and the second electrode are also symmetrical.

9. The flow battery as recited in claim 7, wherein the flow of the second loop is configured to be re-directed to the first electrode and the flow of the first loop is configured to be re-directed to the second electrode after a defined period of operation.

10. The flow battery as recited in claim 1, wherein the first electrode is a negative electrode and the second electrode is a positive electrode, and the supply/storage system is configured to be changed such that the first electrode becomes the positive electrode and the second electrode becomes the negative electrode, responsive to a defined time period of operation of the at least one cell.

11. The flow battery as recited in claim 1, wherein the first and second liquid electrolytes are both vanadium-sulfate salts dissolved in sulfuric acid.

12. A flow battery comprising:
at least one cell including a first electrode, a second electrode spaced apart from the first electrode, and an electrolyte separator layer arranged between the first electrode and the second electrode; and
a supply/storage system external of the at least one cell and including:
a first vessel fluidly connectable in a first loop with each of the first electrode and the second electrode, and
a second vessel fluidly connectable in a second loop with each of the first electrode and the second electrode,
the supply/storage system including a first configuration in which the at least one cell is operable in a forward flow there through to selectively store and discharge electrical energy using reversible redox reactions of a redox pair, wherein the first configuration the first vessel is fluidly connected in the first loop with the first electrode and the second vessel is fluidly connected in the second loop with the second electrode, and a second configuration in which the at least one cell is also operable in a reverse flow there through to selectively store and discharge electrical energy using the reversible redox reactions of the redox pair, wherein in the second configuration the first vessel is fluidly connected in the first loop with the second electrode and the second vessel is fluidly connected in the second loop with the first electrode.

13. The flow battery as recited in claim 12, wherein the first electrode and the second electrode include respective vertical mid-lines about which the first electrode and the second electrode are also symmetrical.

14. The flow battery as recited in claim 12, wherein switching between the first configuration and the second configuration is responsive to a defined time period of operation of the flow battery.

15. The flow battery as recited in claim 12, wherein the first electrode is a negative electrode and the second electrode is a positive electrode.

* * * * *